United States Patent
Johnson et al.

[11] 3,762,736
[45] Oct. 2, 1973

[54] HITCH FOR USE WITH SLEDS AND THE LIKE

[75] Inventors: Robert D. Johnson, Gurnee; Chester Hook, Waukegan, both of Ill.

[73] Assignee: Jerry Martin Company, Gurnee, Ill.

[22] Filed: Sept. 3, 1971

[21] Appl. No.: 177,641

[52] U.S. Cl. .................................................. 280/24
[51] Int. Cl. ............................................ B62b 15/00
[58] Field of Search ..................... 280/24, 492, 493, 280/494; 180/5 R

[56] References Cited
UNITED STATES PATENTS

| 3,560,013 | 2/1971 | Lee | 280/24 |
| 2,580,538 | 1/1952 | Gentsch | 280/492 |
| 1,229,465 | 6/1917 | Hudson | 280/492 |
| 2,027,499 | 1/1936 | Tully | 280/492 |
| 2,650,832 | 9/1953 | Hume | 280/492 |
| 3,580,612 | 5/1971 | Pearson | 280/492 |
| 2,153,309 | 4/1939 | Milz | 280/492 |
| 1,257,454 | 2/1918 | Brady | 280/493 |
| 3,552,775 | 1/1971 | Warner | 280/492 |
| 2,867,452 | 1/1959 | Ricklick | 280/492 |

*Primary Examiner*—Robert R. Song
*Attorney*—Axel A. Hofgren et al.

[57] ABSTRACT

A hitch adapted for connecting sleds and the like to snowmobiles. The hitch includes a universal connection at the snowmobile and a swivel connection at the sled. The connection to the sled is by means of a pair of elongated members clamping a forward portion of the sled therebetween for improved control of the towing action. The hitch includes means for ready removable installation.

9 Claims, 6 Drawing Figures

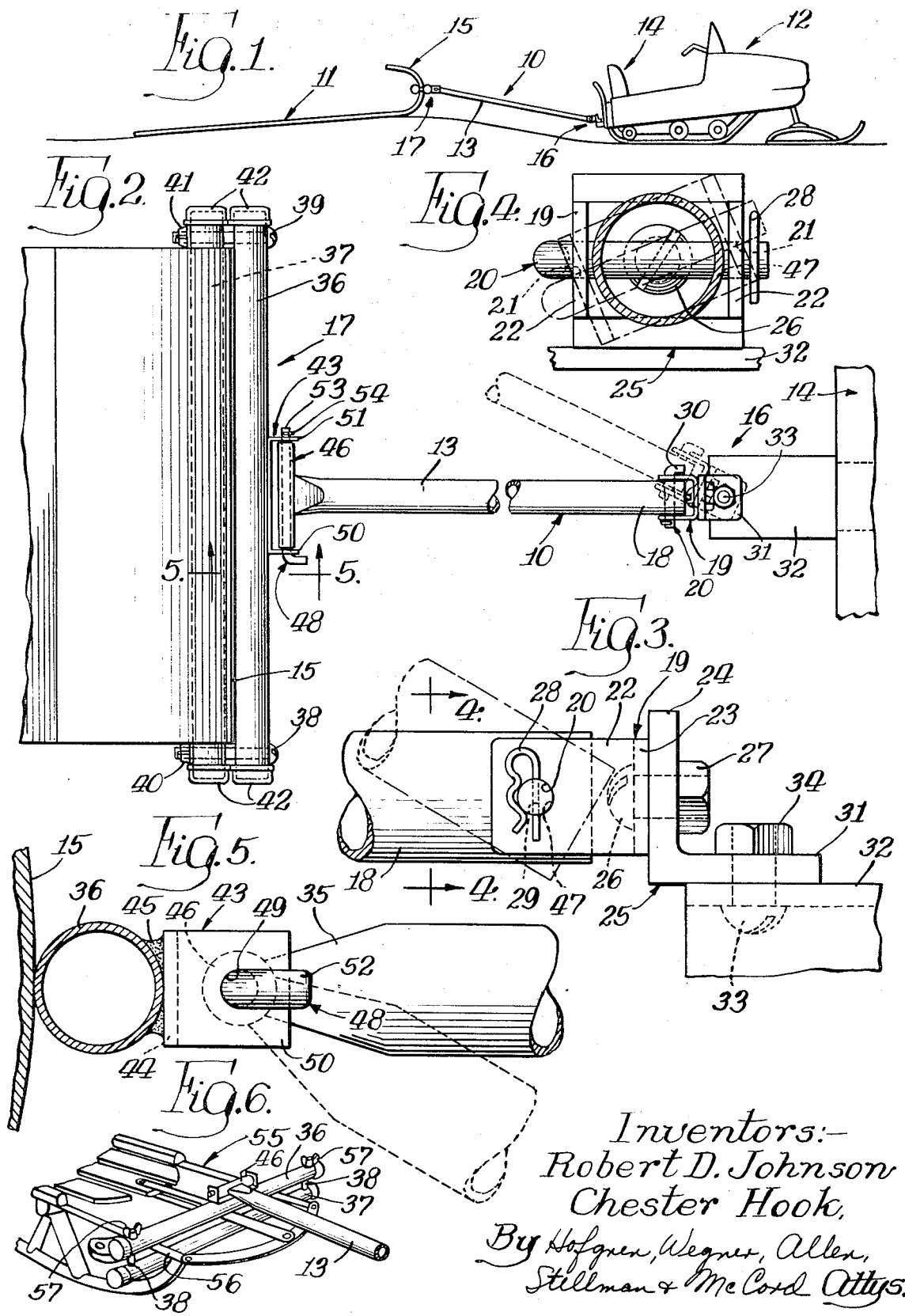

HITCH FOR USE WITH SLEDS AND THE LIKE

BACKGROUND OF THE INVENTION

1. Field of the Invention

This invention relates to hitches and in particular to hitches for connecting sleds and the like to pulling means such as snowmobiles.

2. Description of the Prior Art

In the use of snowmobiles and the like, the operator may at times tow other devices, such as sleds, behind the snowmobile. One form of sled conventionally so towed comprises a conventional toboggan.

A conventional means for connecting the toboggan to the snowmobile comprises ropes and the like. The use of such connecting means has proven dangerous in that sudden stops or sharp turns of the snowmobile often causes loss of control of movement of the towed toboggan with resulting crashing of the toboggan not only into elements of the terrain, but often into the rear of the snowmobile.

SUMMARY OF THE INVENTION

The present invention comprehends an improved hitch adapted for use in towing a sled, such as a toboggan, by a snowmobile, or the like, providing high safety in the towing operation while yet comprising an extremely simple and economical structure.

More specifically, the invention comprehends the provision of a hitch for use with a snowmobile in pulling a sled having a laterally wide front portion, comprising a pair of elongate clamp elements, means for clamping the clamp elements to the wide sled front portion to extend substantially perpendicular to the longitudinal centerline of the sled, and a connector for connecting the clamp elements to a rear portion of the snowmobile with a preselected spacing therebetween, the connector permitting limited lateral and vertical displacement of the sled front portion relative to the snowmobile rear portion.

The means for connecting the hitch to the snowmobile may comprise a universal joint. The means for connecting the hitch to the sled may comprise a pair of elongated members clamped about a wide portion of the sled such as the upturned front end of a toboggan and including movable connection means.

The interconnecting means comprises a rigid tongue member which maintains a desired spacing between the front of the sled and the rear of the snowmobile to prevent crashing of the sled into the rear of the snowmobile as upon sudden stops. The tongue is readily removably connected to the connectors on the snowmobile and sled, herein by removable pin means, so that the snowmobile and sled may be operated individually when desired without fully removing the connecting means therefrom, permitting facilitated reconnection of the snowmobile and sled when desired.

The means for clamping onto the sled are adapted for connecting onto other devices, such as conventional children's sleds, by engaging relatively wide front portions thereof. The movable connections of the tongue to each of the snowmobile and the sled permit for an adjustment of the disposition of the sled relative to the snowmobile both vertically and laterally while yet providing effective control of the movement of the sled relative to the snowmobile.

The hitch of the present invention is light in weight for facilitated handling in connection and disconnection thereof relative to the snowmobile and sled.

BRIEF DESCRIPTION OF THE DRAWING

Other features and advantages of the invention will be apparent from the following description taken in connection with the accompanying drawing wherein:

FIG. 1 is a side elevation of a snowmobile and toboggan interconnected by a hitch embodying the invention;

FIG. 2 is a fragmentary enlarged top plan view thereof with the tongue being shown in an alternate angularly displaced position in dotted lines;

FIG. 3 is a fragmentary enlarged side elevation of the means for connecting the hitch to the snowmobile;

FIG. 4 is a vertical section taken substantially along the line 4—4 of FIG. 3;

FIG. 5 is an enlarged vertical section taken substantially along the line 5—5 of FIG. 2; and FIG. 6 is a fragmentary perspective view of the connection of the hitch to a conventional child's sled.

DESCRIPTION OF THE PREFERRED EMBODIMENT

In the exemplary embodiment of the invention as disclosed in the drawing, a hitch generally designated 10 is adapted for use in connecting a sled, such as a toboggan sled, 11 to a towing means, such as a snowmobile 12. The hitch includes a rigid elongated tongue member 13 which maintains a desired spacing between the rear 14 of the snowmobile and the front 15 of the sled. The tongue is connected to the snowmobile by a movable connector 16 and to the sled by a movable connector 17 to provide a flexible connection therebetween permitting vertical and lateral displacement of the sled relative to the rear of the snowmobile in the normal operation of the apparatus. The hitch 10 provides an improved control in the towing action providing a high degree of safety while yet comprising a simple low cost structure.

More specifically, as shown in FIGS. 2–4, hitch 10 comprises a tubular tongue formed of a rigid material such as metal, having a front end 18 connected to a U-bracket 19 by means of a pin 20 extending through a pair of axially aligned openings 21 in the spaced legs 22 of the U-bracket. The bight 23 of the U-bracket is secured to an upturned portion 24 of an angle bracket 25 by means of a screw 26 extending through the bight 23 and angle bracket portion 24 and retained in association therewith by a suitable nut 27. Pin 20 is retained in association with tongue end 18 and U-bracket 19 by means of a cotter pin 28 extending through a suitable diametric hole 29 in one end of the pin and a turned end 30 at the opposite end of the pin disposed outwardly of the lefthand leg 22, as shown in FIG. 4.

The other leg 31 of the angle bracket 25 is pivotally mounted on a connecting bar 32 extending rearwardly from the snowmobile rear portion 14, by means of a pivot screw 33 extending through the bar 32 and leg portion 31 and retained in association therewith by a nut 34, as shown in FIG. 3.

Thus, leg 31 of the angle bracket 25 may pivot about a vertical axis of pivot screw 33 and U-bracket 19 may pivot about a horizontal axis of pivot screw 26 while tongue end 18 may pivot about a horizontal axis of pin 20, all as shown in FIG. 3, to provide a universal joint connection of the tongue end 18 to the snowmobile. The connection to the snowmobile is readily broken by removing cotter pin 28 and withdrawing pin 20, permitting the angle bracket 25 carrying the U-bracket 19 to remain on the bar 32 so that the snowmobile may be operated independently when desired. When it is desired to reconnect the hitch to the rear end of the snowmobile, the user need merely reinsert the pin through the U-bracket holes 21 and tongue end 18 and replace the cotter pin 28.

The rear end 35 of the tongue may be connected to sled 11 by connector 17 which comprises a novel clamp-type connector for ready removable connection to the front end 15 of the sled. As shown in FIG. 2, the connector includes a pair of parallel elongated clamp elements 36 and 37 which are forcibly urged together by a pair of screws 38 and 39 and lock nuts 40 and 41, respectively. The clamp elements 36 and 37 may comprise tubular elements provided at their outer ends with suitable caps 42. Thus, the clamp elements 36 and 37 may be clamped about the upstanding front portion 15 of the toboggan to provide a firm connection thereof to the toboggan over a relatively wide area minimizing stress in the toboggan structure resulting from the substantial pulling forces generated in the towing of the toboggan by the snowmobile. The rear end 35 of tongue 13 is connected to the front clamp element 36 by means of a U-bracket 43 having a bight portion 44 secured to the element 36 as by welding 45. A tubular member 46 is secured to the distal end of the tongue 13 as by welding to extend perpendicular to the longitudinal axis of the tongue and parallel to the axis of the hole 47 in the front end 18 of the tongue provided for receiving pin 20. A pin 48 is extended through holes 49 in the legs 50 and 51 of the U-bracket 43 and coaxially through the tubular member 46. One end 52 of the pin 48 is turned and the opposite end 53 is provided with a cotter pin 54 for retaining the pin 48 in association with the U-bracket 43 and tubular member 46 to connect the rear end 35 of the tongue 13 to the sled. Thus, pin 48 provides for facilitated connection and disconnection of the sled relative to the tongue 13. Upon disconnection of the pin, the tongue connector element 46 may be separated from the U-bracket while permitting the connecting elements 36 and 37 to remain clamped to the front end of the sled for facilitated reconnection of the sled when desired.

Thus, the connection to the sled provides for swinging of the sled about a horizontal axis at the rear end of the tongue 13 with the sled maintained substantially in longitudinal alignment with the tongue 13 at all times. The horizontal swinging movement of the sled relative to the snowmobile is effected at the front connector 16 while each of the connectors 16 and 17 permits pivotal movement about horizontal axes to provide an improved tracking of the sled behind the snowmobile with maximum safety at all times.

As shown in FIG. 6, the clamp elements 36 and 37 are further adapted for ready connection to the other types of sleds, such as the conventional children's sled 55, having a relatively wide front end portion 56 to which the elements 36 and 37 are clamped. As shown in FIG. 6, the nuts 57 may comprise wing nuts for facilitated manipulation in effecting connection and disconnection of the clamping means. As will be obvious to those skilled in the art, nuts 40 may similarly comprise wing nuts as desired. The use of screws 38 in effecting the clamping action of clamp elements 36 and 37 provides for substantial clamping forces to assure positive connection of the sled through the hitch to the snowmobile effectively precluding inadvertent disconnection thereof in the towing operation thereby providing high safety in the use of the apparatus.

Hitch 10 is formed of relatively lightweight metal members so that the entire hitch structure may have a weight of under approximately 6 lbs. while yet providing high strength and durability for use in towing relatively heavy loads over rugged terrains. The hitch is readily connected and disconnected while yet providing positive association of the sled with the snowmobile in the connected arrangement. In the illustrated embodiment, the tongue has a length of approximately 40 inches so that the front of the sled is spaced approximately 3½ feet from the rear of the snowmobile. As will be obvious to those skilled in the art, any suitable length of the tongue may be utilized.

The foregoing disclosure of specific embodiments is illustrative of the broad inventive concepts comprehended by the invention.

We claim:

1. A hitch for use with a snowmobile in pulling a sled having a laterally wide front portion, comprising: a pair of elongate clamp elements having a length greater than the width of said front portion of the sled; means acting between the clamp elements at the opposite ends thereof laterally outwardly of said sled front portion for clamping said clamp elements to said sled front portion free of strength-reducing deformation of said sled front portion and to extend substantially perpendicular to the longitudinal centerline of the sled; and a connector for connecting said clamp elements to a rear portion of the snowmobile with a preselected spacing therebetween, said connector permitting limited lateral and vertical displacement of said sled front portion relative to said snowmobile rear portion.

2. The hitch of claim 1 wherein said connector comprises a rigid elongate member.

3. The hitch of claim 1 wherein said connector includes a universal joint at said snowmobile rear portion.

4. The hitch of claim 1 wherein said connector includes a swivel joint at the mid-portion of said sled front portion pivoting about a horizontal axis perpendicular to the longitudinal centerline of the sled.

5. The hitch of claim 1 wherein said connector includes a rigid tongue and a universal joint at one end of said tongue and a swivel joint at the opposite end of said tongue.

6. The hitch of claim 1 wherein said connecting means comprises a tongue, a first connector for connecting one end of the tongue removably to the snowmobile, and a second connector for connecting the opposite end of the tongue removably to the sled, each of said connectors including a connector pin and being arranged to be disconnected by the removal of the connector pin.

7. A hitch structure adapted to be connected to a sled, comprising: a pair of parallel elongated clamp members; means extending outwardly of and adjacent the edges of said sled for forcibly urging said clamp members laterally toward each other to rigidly clamp the clamp members to the sled without structural weakening of the sled; a tongue member; and means on a mid-portion of a clamp member for movably connecting said tongue member thereto.

8. The hitch structure of claim 7 wherein said connecting means comprises means for pivotally connecting said tongue to said clamp member for pivoting about an axis parallel to said clamp members.

9. The hitch structure of claim 8 wherein said connecting means comprises a tubular element secured to one end of the tongue, and pin means movably extended through said tubular element and having opposite ends connected to said clamp member.

* * * * *